United States Patent [19]

Maynard et al.

[11] 4,088,732

[45] May 9, 1978

[54] IMPROVED METHOD OF BENEFICIATING CLAY BY REMOVAL OF TITANIUM AND IRON IMPURITIES

[75] Inventors: Robert Nelson Maynard; Bobby Ray Skipper, both of Cochran; Nathan Millman, Macon, all of Ga.

[73] Assignee: J. M. Huber Corporation, Locust, N.J.

[21] Appl. No.: 761,514

[22] Filed: Jan. 21, 1977

Related U.S. Application Data

[63] Continuation of Ser. No. 613,772, Sep. 15, 1975, abandoned, which is a continuation of Ser. No. 527,650, Nov. 27, 1974, abandoned, which is a continuation of Ser. No. 255,913, May 22, 1972, abandoned, which is a continuation of Ser. No. 97,270, Nov. 27, 1970, abandoned, which is a continuation of Ser. No. 745,098, Jul. 16, 1968, abandoned.

[51] Int. Cl.$^2$ ............................................. C01B 33/26

[52] U.S. Cl. .................................. 423/122; 423/328; 106/72

[58] Field of Search .................. 423/122, 328; 106/72

[56] References Cited

U.S. PATENT DOCUMENTS

| | | | |
|---|---|---|---|
| 2,307,239 | 1/1943 | Rowland | 106/72 X |
| 3,303,035 | 2/1967 | Hemstock et al. | 106/72 |
| 3,371,988 | 3/1968 | Maynard et al. | 423/118 |
| 3,446,348 | 5/1969 | Sennett et al. | 209/5 |

*Primary Examiner*—Edward Stern
*Attorney, Agent, or Firm*—John R. Kirk, Jr.; Harold H. Flanders

[57] ABSTRACT

A method of beneficiating kaolin clay by the addition of non-dispersing neutral salts to assist in the removal of discolored impurities, such as titanium and iron bearing minerals from a clay slurry. This process is capable of producing clays having a brightness in the 90–95 range.

2 Claims, No Drawings

IMPROVED METHOD OF BENEFICIATING CLAY BY REMOVAL OF TITANIUM AND IRON IMPURITIES

CROSS REFERENCE TO RELATED APPLICATIONS

This application is a continuation of application Ser. No. 613,772 filed Sept. 15, 1975 now abandoned; which, in turn, was a continuation of application Ser. No. 527,650 filed Nov. 27, 1974, now abandoned; which was a continuation of application Ser. No. 255,913, filed May 22, 1972, now abandoned; which was a continuation of application Ser. No. 97,270, filed Nov. 27, 1970, now abandoned; which was a continuation of application Ser. No. 745,098 filed July 16, 1968, now abandoned.

BACKGROUND OF THE INVENTION

In general, the present invention relates to clays and more particularly to a method for improving the brightness of clays. The present invention is primarily concerned with a method for improving the brightness of kaolin clays in which discolored titanium and iron impurities are removed by gravity settling or centrifugation from a clay slurry.

Natural occurring clays vary considerably in their color properties, even when produced from mines in the same locality or even from different sites in the same mine. Naturally occurring kaolin clay deposits contain discoloring contaminants, for example iron and titanium minerals. Titanium and iron minerals in kaolin usually occur as discolored particles and these are largely responsible for the yellow-brown shade of many kaolins. Often a clay is rejected as being unsuitable for commercial use solely on the basis of its color even though its other physical properties such as the viscosity of its clay-water slurries and its particle size distribution are within desired limits.

The prior art in this area has suffered from its inability to easily and economically correct the color properties of a given clay to those desired. A great deal of difficulty has been experienced in achieving the desired brightness. This difficulty arises in part from the fact that the titanium and iron contaminants in kaolin clay are difficult to alter in color or to remove.

Clays from mines are generally crushed and then slurried to produce a clay slip. The clay slurries are often treated with a peptizing agent in order to achieve minimum viscosity, or a maximum dispersion of clay particles in a slurry to facilitate fractionation to the desired particle distribution. Among the well known peptizing agents utilized in the clay arts are polyphosphates, carbonates, silicates, alkalies in general, mixtures thereof, basic salts, and the like. The amounts of these peptizing agents used in the original deflocculation of the clay slurries may vary from 0.5 pounds per ton of dry clay to 8 pounds per ton of dry clay, the exact amount depending on the clay system itself and the type of peptizing agent used. These slips or slurries are then classified to the desired clay fraction by such methods as hydroseparation, centrifugal forces and the like.

Under these circumstances the brightness of kaolin clays may usually be increased by fractionation, that is, by the preparation of fine fractions of higher surface area. The finer the particle size the brighter the clays. However, this increase in brightness is usually insufficient. The conventional methods of classification of clay slurries normally increase the clay brightness by about 0.5 to 3.5 points above that of the original clay. It should be noted that the mere step of preparing fine fractions does not necessarily reduce the content of discoloring contaminants. In order to be acceptable commercially, additional treatment is often required of the refined clays, such as chemical leaching. Leaching of the clay with chemicals such as zinc or sodium hydrosulphite generally results in improved brightness of the refined clay slurries, but the increase in brightness is ordinarily only on the order of 2 to 5 brightness points.

These clays are then generally filtered and dried, which places the beneficiated clays in a condition for commercial use. Thus, with the normal beneficiating procedures of the clay industry, one is able to prepare clays for commercial use having a brightness not more than around 88 points.

There are other methods of improving the brightness of clays but generally they are excessively expensive and do not give a sufficient increase in brightness to justify the expense.

The use of dispersants as described above produces a state known as deflocculation. It is well known that an excess of peptizing agents can result in an undersirable increase in viscosity because of the formation of a reflocculated state and that if the peptizing treatment is carried too far an intractable gel state will be produced.

Thus, prior to the discovery of Maynard, Skipper and Millman described in U.S. Pat. No. 3,371,988, the prior art practices scrupulously avoided the reflocculated state and attempted to maintain a condition of minimum viscosity during classification. Maynard, et al, discovered that the reflocculated state had unique utility because it creates a system which results in the preferential separation of titanium contaminants, resulting in a significant increase in purity and brightness of the refined kaolin fraction. As described in U.S. Pat. No. 3,371,988, Maynard, et al, discovered that the preferential separation of titanium contaminants could be achieved by adding an excess of peptizing agents beyond the amount required to produce minimum viscosity for classification to deliberately create a reflocculated slurry in which liberation and sedimentation of titanium impurities from the clay particles would spontaneously occur.

The above patented discovery led to additional attempts to discover additional materials which might produce improved effects with further increase in brightness.

Accordingly, it is an object of the present invention to provide a new, unobvious and highly effective method of beneficiating clay which overcomes the deficiencies of the prior art as described above.

It is a further object of the present invention to provide a method of producing clays with a higher brightness than possible by conventional prior art treatments of the same clay.

Other objects and a fuller understanding of the present invention may be had by referring to the following description and claims taken in conjunction with one another.

SUMMARY OF THE INVENTION

The present invention overcomes the deficiencies of the prior art and achieves its objectives by providing for the addition of non-dispersing neutral salts along with a peptizing agent in excess of the amount required to obtain minimum viscosity in the treatment of an aqueous clay suspension to improve the brightness of the kaolin clay.

DESCRIPTION OF THE PREFERRED EMBODIMENTS

In order to facilitate the understanding of the present invention, reference will now be made to the general process of beneficiating clays in which the novel method steps of the present invention are employed. This discussion will be followed by several specifically preferred embodiments and examples of the present invention which are illustrative and should not be construed as limiting the invention but are exemplary only.

Clays from mines are generally crushed and then slurried. To such a slurry is added a peptizing agent. Any suitable material exhibiting the properties of a peptizing or dispersing agent may be employed. Typical peptizing agents include polyphosphates, carbonates, silicates, alkalies in general, mixtures thereof, and basic salts. Following the process set forth in full in U.S. Pat. No. 3,371,988 and incorporated herein by reference, an excess of peptizing agent beyond the amount required to achieve minimum viscosity or maximum dispersion of the clay particles to facilitate fractionation is added to the slurry.

For purposes of the present application the term "minimum viscosity" is defined as that property of each clay-water-dispersant system which is measured at 60% solids with a Brookfield viscometer at 10 r.p.m. using the No. 1 spindle. The dispersant dose needed to effect minimum viscosity at 60% solids for each system is arbitrarily defined to be the same regardless of the solids composition at which the slurries are subsequently treated in the process of the present invention. In addition, to the peptizing agents added a quantity of non-dispersing neutral salts amounting to from about 2 to about 20 pounds per ton of clay is added to the slurry. The addition of the neutral salts with the peptizing agents in excess of the amount required to produce minimum viscosity and produce a reflocculated state within the clay slurry but less than the amount sufficient to cause a gel state causes the liberation of titanium and iron impurities from the clay particles. This process is manifested initially by an overall darkening of the original slurry followed by the formation of yellow-brown or tan colored, vertical streaks which extend over the length of the column. These streaks often appear as soon as the overdose of peptizing agents and neutral salts are added but in every case will appear after a short settling period. These impurities eventually settle to the bottom of the container to form a discolored sediment. After the settling is complete as indicated by the disappearance of the tan colored vertical streaks the refined suspension may be siphoned off or otherwise separated. Obviously other methods of separation than natural gravity may be utilized to remove the titanium impurities, as for example centrifuging.

The above process may be practiced on bleached or unbleached crude clays or fractions thereof.

If leaching is desired following the above process chemical leaching agents such as zinc or sodium hydrosulphite may be utilized to further improve the brightness.

The clay may then be filtered and dried to condition it for commercial uses as desired.

The invention may be more fully understood by reference to the following illustrative examples. All percentages in the following examples are given by weight unless otherwise indicated.

EXAMPLE 1

As a control for the next three examples showing the effect of neutral salts in reflocculated slurries on the titanium impurities, a sample of crude clay, having a brightness of 81.8, was obtained from a mine located in East Georgia. This crude was slurried at about 35 per cent clay solids and dispersed with 8 pounds of sodium hexametaphosphate (Calgon) per ton of dry clay, an amount required to obtain minimum viscosity.

A conventional type of fine fraction was separated from the dispersed crude. This slurry was composed of clay having a brightness of 83.9. Conventional leaching with 10 pounds of zinc hydrosulfite per ton of dry clay and 6 pounds of alum per ton of dry clay gave a brightness of 87.8. This clay contained 1.14 percent, by weight, of iron impurities expressed as $Fe_2O_3$ and 2.46 percent, by weight, of titanium impurities expressed as $TiO_2$.

EXAMPLE 2

The starting crude of Example 1 was treated by mixing with a Cowles Dissolver for 30 minutes at 68 percent solids with a dispersant, a combination of sodium hexametaphosphate, amounting to 10 pounds per ton of dry clay, and sodium metasilicate, amounting to 20 pounds per ton of dry clay. This treated slurry was diluted to 26 percent clay solids, by weight, and mixed 20 minutes. The slurry was transferred to a transparent container and allowed to settle, without agitation, in a 56 inch slurry height column. Within a period of ½ to 1 hour, the slurry became visibly discolored with an evenly distributed tan coloration when compared with the untreated slurry of Example 1. Highly discolored streaks or striations with visibly lighter color areas between the streaks extended from top to bottom in the slurry column. After about 89 hours, the vertical disclored streaks disappeared and a yellow sludge deposit became constant in depth. The clay suspension was withdrawn leaving the deposit in the bottom of the column.

The recovered clay was washed substantially free of excess chemicals. This was accomplished by acidifying the slurry with 16.5 pounds of sulfuric acid per ton of dry clay and 17.0 pounds of alum per ton of dry clay to create a flocculated slurry which was filtered. The filtered material was diluted with water and reslurried to about 30 percent solids. This slurry was composed of clay having a brightness of 86.6 before leaching and a brightness of 91.5 after leaching or 3.7 points higher than the control. This specially treated clay contained 1.14 percent, by weight of iron impurities expressed as $Fe_2O_3$ and 1.1 percent titanium impurities expressed as $TiO_2$.

EXAMPLE 3

Example 2 was repeated except the starting crude was treated by slurrying with a dispersant, a combination of sodium hexametaphosphate, amounting to 10 pounds per ton of dry clay, and sodium metasilicate, amounting to 20 pounds per ton of dry clay and a neutral salt, sodium chloride, amounting to 4 pounds per ton of dry clay before sedimentation.

This specially beneficiated clay had a brightness of 88.4 before leaching and a brightness of 92.5 after leaching or 4.7 points higher than the control. This beneficiated clay contained 1.03 percent, by weight, of iron impurities expressed as $Fe_2O_3$ and 0.83 percent titanium impurities expressed as $TiO_2$.

EXAMPLE 4

Example 2 was repeated except the starting crude was treated by slurrying with a dispersant, a combination of sodiumhexametaphosphate, amounting to 10 pounds per ton of dry clay, and sodium metasilicate, amounting to 15 pounds per ton of dry clay and a neutral salt, sodium chloride, amounting to 15 pounds per ton of dry clay before sedimentation.

This specially refined clay had a brightness of 93.6 before leaching and a brightness of 94.9 after leaching or 7.1 points higher than the control. This refined clay contained 0.95 percent, by weight, of iron impurities expressed as $Fe_2O_3$ and 0.06 percent, by weight, of titanium impurities expressed as $TiO_2$.

of 90.7 after leaching, or 3.7 points higher than the control.

EXAMPLE 7

Example 6 was repeated except the starting crude was treated with a neutral salt, sodium chloride, amounting to 4 pounds per ton of dry clay, in addition to the dispersant combination of 10 pounds of sodium hexametaphosphate per ton of dry clay and 20 pounds of sodium metasilicate per ton of dry clay.

This specially refined clay had a brightness of 91.7 after bleaching or 4.7 points higher than the control.

EXAMPLE 8

Example 6 was repeated except the starting crude was treated with a neutral salt, potassium chloride, amounting to 6 pounds per ton of dry clay, in addition to the dispersant combination of 10 pounds of sodium

TABLE I

| | EFFECT OF NEUTRAL SALT ON REDUCTION IN CONTENT OF IMPURITIES | | | | | | |
|---|---|---|---|---|---|---|---|
| | CHEMICAL TREATMENT | | | FINISHED CLAY | | | |
| | | DISPERSANT | NEUTRAL SALT | $Fe_2O_3$ | $TiO_2$ | BRIGHTNESS | |
| CONDITION | DISPERSANT IDENTITY | LBS/TON CLAY | LBS/TON CLAY | Content PERCENT | Content PERCENT | UN-BLEACHED | BLEACHED |
| Control, Ex. 1 (Control Reflocculated) | — | — | — | 1.14 | 2.46 | 83.9 | 87.8 |
| Treated Clay, Example 2 | Sodium Hexametaphosphate Sodium Metasilicate | 10 20 | — — | 1.14 | 1.10 | 86.6 | 91.5 |
| Treated Clay, Example 3 | Sodium Hexametaphosphate Sodium Metasilicate | 10 20 | — 4 | 1.03 | 0.83 | 88.4 | 92.5 |
| Treated Clay, Example 4 | Sodium Hexametaphosphate Sodium Metasilicate | 10 15 | — 15 | 0.95 | 0.06 | 93.6 | 94.9 |

EXAMPLE 5

As a control for the next 4 examples showing the effect of various neutral salts in a reflocculated slurry, a sample of crude clay, having a brightness of 80.8, was obtained from East Georgia deposits. This crude was slurried at about 35 percent dry solids and dispersed with 8 pounds of sodium hexametaphosphate per ton of dry clay, an amount required to obtain minimum viscosity.

A conventional type of fine fraction was separated from the dispersed crude. This slurry was composed of clay having a brightness of 83.0. Conventional leaching with 10 pounds of zinc hydrosulfite per ton of dry clay and 6 pounds of alum per ton of dry clay gave a brightness of 87.0.

EXAMPLE 6

The starting crude of Example 5 was treated by mixing in a Waring Blender for 30 minutes at 65 percent clay solids with a dispersant, a combination of sodium hexametaphosphate, amounting to 10 pounds per ton of dry clay and sodium metasilicate, amounting to 20 pounds per ton of dry clay. This treated slurry was diluted to 26 percent clay solids, by weight, and mixed 10 minutes. The slurry was transferred to a transparent container and allowed to settle without agitation at a slurry height column of 11.4 inches for approximately 18 hours. After settling of discolored impurities the clay suspension was withdrawn and washed substantially free of excess chemicals by the method described in Example 2. This specially treated clay had a brightness hexametaphosphate per ton of dry clay and 20 pounds of sodium metasilicate per ton of dry clay.

This specially refined clay had a brightness of 91.7 after bleaching, or 4.7 points higher than the control.

EXAMPLE 9

Example 6 was repeated except the starting crude was treated with a neutral salt, sodium nitrate, amounting to 2 pounds per ton of dry clay, in addition to the dispersant combination of 10 pounds of sodium hexametaphosphate per ton of dry clay and 20 pounds of sodium metasilicate per ton of dry clay.

This specially refined clay had a brightness of 91.1 after bleaching or 3.1 points higher than the control.

EXAMPLE 10

As a control for the next 4 examples showing the effect of various neutral salts in a reflocculated slurry, a sample of unbleached slurry, containing 31.0 percent clay solids, was obtained from normal plant production. This clay was previously refined from crudes obtained from Central Georgia deposits by dispersing with 4 pounds of Calgon, sodium hexametaphosphate, per ton of dry clay to minimum viscosity and classifying to a No. 1 coating grade fraction. The clay of this slurry had a brightness of 83.7. Conventional bleaching with 10 pounds of zinc hydrosulfite per ton of dry clay and 6 pounds of alum per ton of dry clay gave a brightness of 88.0.

EXAMPLE 11

The starting slurry of Example 10, containing 31.0 percent clay solids, was treated by mixing in a Waring Blender for 30 minutes, with an additional amount of dispersant, a combination of sodium hexametaphosphate, amounting to 15 pounds per ton of dry clay, and sodium carbonate, amounting to 5 pounds per ton of clay. This slurry was transferred to a transparent container and allowed to settle, without agitaton, at a slurry height column of 11.4 inches. The formation of a discolored state followed by typical vertical streaks were noted as described in the previous Example 2. These streaks disappeared after a period of approximately 16 hours. After sedimentation, the clay suspension was withdrawn from the off-colored deposit and washed substantially free of excess chemicals by the method described in Example 2. This specially treated clay had a brightness of 90.1 after bleaching or 2.1 points higher than the control.

EXAMPLE 12

Example 11 was repeated except the starting slurry was treated with a neutral salt, sodium sulfate, amounting to 5 pounds per ton of dry clay, in addition to the dispersant combination of 15 pounds of sodium hexametaphosphate per ton of dry clay and 5 pounds of sodium carbonate per ton of dry clay.

This specially refined clay had a brightness of 90.9 after bleaching or 2.9 points higher than the control.

EXAMPLE 13

Example 11 was repeated except the starting slurry was treated with a neutral salt, potassium chloride, amounting to 5 pounds per ton of dry clay in addition to the dispersant combination of 15 pounds of sodium hexametaphosphate per ton of dry clay and 5 pounds of sodium carbonate per ton of dry clay.

This specially refined clay had a brightness of 91.0 after bleaching or 3.0 points higher than the control.

EXAMPLE 14

Example 11 was repeated except the starting slurry was treated with a neutral salt, sodium chloride, amounting to 10 pounds per ton of dry clay in addition to the dispersant combination of 15 pounds of sodium hexametaphosphate per ton of dry clay and 5 pounds of sodium carbonate per ton of dry clay, and the treated slurry was diluted in clay solids content to 20.0 percent with water prior to sedimentation.

This specially treated clay had a brightness of 90.7 after bleaching or 2.7 points higher than the control.

TABLE II
EFFECT OF VARIOUS NEUTRAL SALTS IN REFLOCCULATED SLURRIES

| CONDITION | NEUTRAL SALT IDENTITY | LBS/TON CLAY | REFINED CLAY BRIGHTNESS UNBLEACHED | BLEACHED |
|---|---|---|---|---|
| East Georgia Crude Control Example 5 | — | — | 83.0 | 87.0 |
| (Control Reflocculated Treated Clay, Example 6 | — | — | — | 90.7 |
| Treated Clay, Example 7 | Sodium Chloride | 4 | — | 91.7 |
| Treated Clay, Example 8 | Potassium Chloride | 6 | — | 91.7 |
| Treated Clay, Example 9 | Sodium Nitrate | 2 | — | 91.1 |
| Refined fraction from Central Georgia Crude Example 10 (Control Reflocculated) | — | — | 83.7 | 88.0 |
| Treated Clay, Example 11 | — | — | — | 90.1 |
| Treated Clay, Example 12 | Sodium Sulfate | 5 | — | 90.9 |
| Treated Clay, Example 13 | Potassium Chloride | 5 | — | 91.0 |
| Treated Clay, Example 14 | Sodium Chloride | 10 | — | 90.7 |

In the present case, the term "non-dispersing neutral salts" typically refers to materials such as halides, nitrates, and sulfates of the alkaline and alkaline-earth metals. In addition to the non-dispersing neutral salts set forth in the above examples any other material exhibiting the properties of a non-dispersing neutral salt may be employed with the peptizing agents in the treatment of the present invention.

While the invention has been described with reference to its preferred embodiments, it will be understood by those skilled in the art that various changes may be made and equivalents may be substituted for elements thereof without departing from the true spirit and scope of the invention. In addition, many modificatons may be made to the teaching of the invention without departing from its essential teachings.

What is claimed is:

1. An improved method for beneficiating an East Georgio kaolin clay, said method comprising the steps of:
    1. treating an aqueous suspension of the kaolin clay be adding to the aqueous kaolin clay suspension a peptizing agent selected from the group consisting of polyphosphates, carbonates, silicates, alkalies, basic salts, and combinations thereof, in an amount in excess of that required to obtain minimum Brookfield viscosity of the kaolin clay-water-dispersant system as defined by measurement at 60% solids with a Brookfield viscometer at 10 r.p.m. using a No. 1 spindle;
    2. further treating the aqueous suspension of the East Georgia kaolin clay by adding to the aqueous clay suspension from 4 pounds to 15 pounds per ton of kaolin clay of a non-dispersing neutral salt selected from the group consisting of sodium chloride, potassium chloride, sodium nitrate, sodium sulfate, and combinations thereof;
    3. separating the contaminants from the clay by sedimentation within the aqueous kaolin clay slurry at a kaolin clay solids content in excess of 20 percent by weight and recovering a clay product having a brightness in the range of from 91 to 95 after bleaching of said clay product.

2. The method of claim 1 wherein the neutral non-dispersing salt is sodium chloride.

* * * * *